(12) United States Patent
Betker et al.

(10) Patent No.: US 7,154,886 B2
(45) Date of Patent: Dec. 26, 2006

(54) METHOD AND SYSTEM FOR PRIMARY BLADE SELECTION IN A MULTI-MODULE FIBER CHANNEL SWITCH

(75) Inventors: Steven Manning Betker, Shoreview, MN (US); Timothy R. Vitters, Bloomington, MN (US); Renae M. Weber, Minneapolis, MN (US)

(73) Assignee: QLogic Corporation, Aliso Viejo, CA (US)

( * ) Notice: Subject to any disclaimer, the term of this patent is extended or adjusted under 35 U.S.C. 154(b) by 1072 days.

(21) Appl. No.: 10/200,487

(22) Filed: Jul. 22, 2002

(65) Prior Publication Data

US 2004/0013125 A1    Jan. 22, 2004

(51) Int. Cl.
*H04L 12/24* (2006.01)
(52) U.S. Cl. ...................................... 370/386; 370/426
(58) Field of Classification Search ................ 370/360, 370/386, 426
See application file for complete search history.

(56) References Cited

U.S. PATENT DOCUMENTS

| | | | |
|---|---|---|---|
| 4,162,375 A | 7/1979 | Schlichte ..................... 179/15 |
| 4,425,640 A | 1/1984 | Philip et al. .................. 370/58 |
| 4,546,468 A | 10/1985 | Christmas et al. ............ 370/54 |
| 4,569,043 A | 2/1986 | Simmons et al. ............. 370/63 |
| 4,725,835 A | 2/1988 | Schreiner et al. ...... 340/825.83 |
| 4,821,034 A | 4/1989 | Anderson et al. ........... 340/825 |
| 5,144,622 A | 9/1992 | Takiyasu et al. ......... 370/85.13 |
| 5,367,520 A | 11/1994 | Cordell ........................ 370/60 |
| 5,598,541 A | 1/1997 | Malladi ...................... 395/286 |
| 5,610,745 A | 3/1997 | Bennett ...................... 359/139 |
| 5,687,172 A | 11/1997 | Cloonan et al. ............ 370/395 |
| 5,748,612 A | 5/1998 | Stoevhase et al. .......... 370/230 |
| 5,818,842 A | 10/1998 | Burwell et al. ............. 370/397 |
| 5,894,560 A | 4/1999 | Carmichael et al. |
| 5,987,028 A | 11/1999 | Yang et al. .................. 370/380 |
| 5,999,528 A | 12/1999 | Chow et al. ................. 370/365 |
| 6,014,383 A | 1/2000 | McCarty ..................... 370/453 |
| 6,021,128 A | 2/2000 | Hosoya et al. .............. 370/380 |
| 6,047,323 A | 4/2000 | Krause ........................ 709/227 |
| 6,081,512 A | 6/2000 | Muller et al. ............... 370/256 |
| 6,118,776 A | 9/2000 | Berman |
| 6,128,292 A | 10/2000 | Kim et al. ................... 370/356 |
| 6,144,668 A | 11/2000 | Bass et al. |
| 6,160,813 A | 12/2000 | Banks et al. ................ 370/422 |

(Continued)

FOREIGN PATENT DOCUMENTS

EP        0649098 A2     9/1994

(Continued)

OTHER PUBLICATIONS

Douglas W. Brown, 'A State-Machine Synthesizer-SMS', 1981, !8th Design Automation Conference, pp. 301-305.*

(Continued)

*Primary Examiner*—Melvin Marcelo
(74) *Attorney, Agent, or Firm*—Klein, O'Neill & Singh, LLP

(57) ABSTRACT

A system and method for selecting a primary blade in a multi-module fibre channel switch with plural blades is provided. The system includes a state machine for sending exchangeable blade parameter(s) ("EBP") to the plural blades; and determining if a primary blade flag is set. If the primary blade flag is set, selecting the blade with the EBP priority number. If the primary blade flag is not selected, then selecting a blade with an EBP priority number if the EBP priority number is less than a retained priority number.

10 Claims, 4 Drawing Sheets

U.S. PATENT DOCUMENTS

| | | | |
|---|---|---|---|
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,353,612 B1 | 3/2002 | Zhu et al. | |
| 6,370,605 B1 | 4/2002 | Chong | |
| 6,411,599 B1 | 6/2002 | Blanc et al. | 370/219 |
| 6,424,658 B1 | 7/2002 | Mathur | 370/429 |
| 6,449,274 B1 | 9/2002 | Holden et al. | 370/392 |
| 6,467,008 B1 | 10/2002 | Gentry et al. | |
| 6,597,691 B1 | 7/2003 | Anderson et al. | 370/360 |
| 6,597,777 B1 | 7/2003 | Ho | |
| 6,697,359 B1 | 2/2004 | George | 370/357 |
| 6,760,302 B1 | 7/2004 | Ellinas et al. | |
| 6,886,141 B1 | 4/2005 | Kunz et al. | |
| 2001/0038628 A1 | 11/2001 | Ofek et al. | 370/392 |
| 2002/0034178 A1 | 3/2002 | Schmidt et al. | |
| 2002/0196773 A1 | 12/2002 | Berman | |
| 2003/0016683 A1 | 1/2003 | George et al. | |
| 2003/0091062 A1 | 5/2003 | Lay et al. | |
| 2003/0120983 A1 | 6/2003 | Vieregge et al. | |
| 2003/0179748 A1 | 9/2003 | George et al. | 370/389 |
| 2003/0189935 A1 | 10/2003 | Warden et al. | |
| 2004/0013092 A1 | 1/2004 | Betker et al. | |
| 2004/0013125 A1 | 1/2004 | Betker et al. | |
| 2004/0024831 A1* | 2/2004 | Yang et al. | 709/208 |
| 2004/0028038 A1 | 2/2004 | Anderson et al. | |
| 2004/0141521 A1 | 7/2004 | George | 370/463 |
| 2006/0047852 A1* | 3/2006 | Shah et al. | 709/245 |
| 2006/0074927 A1* | 4/2006 | Sullivan et al. | 707/100 |

FOREIGN PATENT DOCUMENTS

| | | |
|---|---|---|
| EP | 0856969 A1 | 1/1998 |
| WO | WO-98/36537 A1 | 8/1998 |

OTHER PUBLICATIONS

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks", Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

Fibre Channel Switch Fabric—2 (FC-SW-2) Rev 5.4, NCITS working draft proposed American National Standard for Information Technology, Jun. 26, 2001., T11/Project 1305-D/Rev 5.4.

Fibre Channel Generic Services—3 (FC-GS-3) Rev 7.01, NCITS working draft proposed American National Standard for Information Technology, Nov. 28, 2000., T11/Project 1356 D/Rev 7.01.

Curtis, A. R., "Design Considerations for 10-Gbit Fibre Channel", *Curtis A. Ridgeway, Distinguished I/O Architect, Storage and Computing ASIC's Division, LSI Logic Corp.*, Apr. 2003.

Malavalli, Kumar, "High Speed Fibre Channel Switching Fabric Devices", *Proceedings of the SPIE, SPIE, Bellingham, VA, USA vol. 1577*.. XP000562869, ISSN: 0277-786X,(Sep. 4, 1991),216-226.

Melhem, et al., "Minimizing Wavelength Conversions in WDM Path Establishment", *Computer Science Department, University of Pittsburgh, Pittsburgh, PA 15260*, (2001), 197-211.

Ridgeway, Curt, "0GFC-40GFC using 4-lane XAUI's", *LSI Logic Presentation—T11/03-069v0*.

\* cited by examiner

METHOD AND SYSTEM FOR PRIMARY BLADE SELECTION IN A MULTI-MODULE FIBER CHANNEL SWITCH

CROSS REFERENCE TO RELATED APPLICATION

This application is related to U.S. patent application entitled "METHOD AND SYSTEM FOR DYNAMICALLY ASSIGNING DOMAIN IDENTIFICATION IN A MULTI-MODULE FIBRE CHANNEL SWITCH", Ser. No. 10/200,393, having common inventors and Assignee, filed on even date herewith, the disclosure of which is incorporated herein by reference in its' entirety.

BACKGROUND

1. Field of the Invention

The present invention relates to networking systems, and more particularly to systems using fibre channel fabrics for interconnecting fibre channel devices.

2. Background of the Invention

Fibre channel is a set of American National Standard Institute (ANSI) standards which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel a path is established between two nodes where the path's primary task is to transport data from one point to another at high speed with low latency, performing only simple error detection in hardware. The fibre channel switch provides circuit/packet switched topology by establishing multiple simultaneous point-to-point connections.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives a message from one port and automatically routes it to another port. Multiple calls or data transfers happen concurrently through the multi-port fibre channel switch.

Fibre channel switches may use multiple modules (also referred to as "blades") connected by fibre channel ports. Conventionally, a multi-module switch is integrated as a single switch and appears to other devices in the fibre channel fabric as a single switch.

Conventional systems do not have an efficient way to select a primary blade so that a multi-module switch appears as a single switch.

Therefore, what is required is a process and system that efficiently selects a primary blade in a multi-module switch environment so that a multi-module switch appears as a single switch to other devices.

SUMMARY OF THE INVENTION

In one aspect, the present invention solves the foregoing drawbacks by providing a method for selecting a primary blade in a multi-module fibre channel switch with plural blades. The method includes sending exchangeable blade parameter(s) ("EBP") to plural blades; and determining if a primary blade flag is set. If the primary blade flag is set, selecting the blade with the EBP priority number and blade slot number. If the primary blade flag is not selected, then selecting a blade with an EBP priority number less than a retained EBP priority number.

In yet another aspect, the method according to the present invention includes selecting a blade with an EBP priority number equal to the retained priority number and a EBP slot number less than a retained primary blade slot number. Thereafter the process sends EBPs to all blades notifying plural blades of the selected primary blade.

In yet another aspect, a method for selecting a primary blade in a multi-module fibre channel switch with plural blades is provided. The method includes intializing plural blade internal ports; starting a timer; sending EBPs to plural blades; selecting a primary blade; and notifying all blades regarding the selected primary blade.

In yet another aspect of the present invention, a system for selecting a primary blade in a multi-module fibre channel switch with plural blades is provided. The system includes a state machine for sending exchangeable blade parameter(s) ("EBP") to the plural blades; and determining if a primary blade flag is set. If the primary blade flag is set, selecting the blade with the EBP priority number and blade slot number. If the primary blade flag is not selected, then the state machine selects a blade with an EBP priority number less than a retained EBP priority number.

In another aspect, the state machine selects a blade with an EBP priority number equal to the retained priority number and an EBP slot number is less than a retained primary blade slot number.

The state machine also sends EBPs to plural blades notifying the blades of the selected primary blade.

In yet another aspect, a system for selecting a primary blade in a multi module fibre channel switch with plural blades is provided. The system includes a state machine for intializing plural blade internal ports; starting a timer; sending EBPs to plural blades; selecting a primary blade; and notifying all blades regarding the selected primary blade.

In one aspect of the present invention, an efficient process for selecting a primary blade is provided so that the multiple modules in a fibre channel switch are able to self-configure to appear as a single switch, without user configuration or intervention. The foregoing process functions even if not all the modules are present, or if some of the internal ports linking modules have failed, as long as connectivity exists internally between the modules.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment of a disk drive. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"Blade": A module in a fibre channel switch.

"Blade_Id": A unique identifier for identifying a switch module.

"B_S_TOV Timer": A timer to detect inactivity during primary blade selection.

"EBP": Exchange Blade Parameters, created by Multi-Blade Protocol

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": A system which interconnects various ports attached to it and is capable of routing fibre channel frames by using destination identifiers provided in FC-2 frame headers.

"Fabric Topology": This is a topology where a device is directly attached to a fibre channel fabric that uses destination identifiers embedded in frame headers to route frames through a fibre channel fabric to a desired destination.

Multi Blade protocol: A protocol that operates on internal switch module ports to assign a primary blade.

Port: A general reference to N. Sub.—Port or F.Sub.—Port.

"Slot Number": A unique identifier for each blade in a multi-module switch derived from the physical location of the blade in a chasis.

The Fibre Channel Specification used to build one embodiment of the present invention includes:

FC-SW-2 standard as published by the American National Standard Institute.

To facilitate an understanding of the preferred embodiment, the general architecture and operation of a fibre channel system will be described. The specific architecture and operation of the preferred embodiment will then be described with reference to the general architecture of the fibre channel system.

Figure 1:
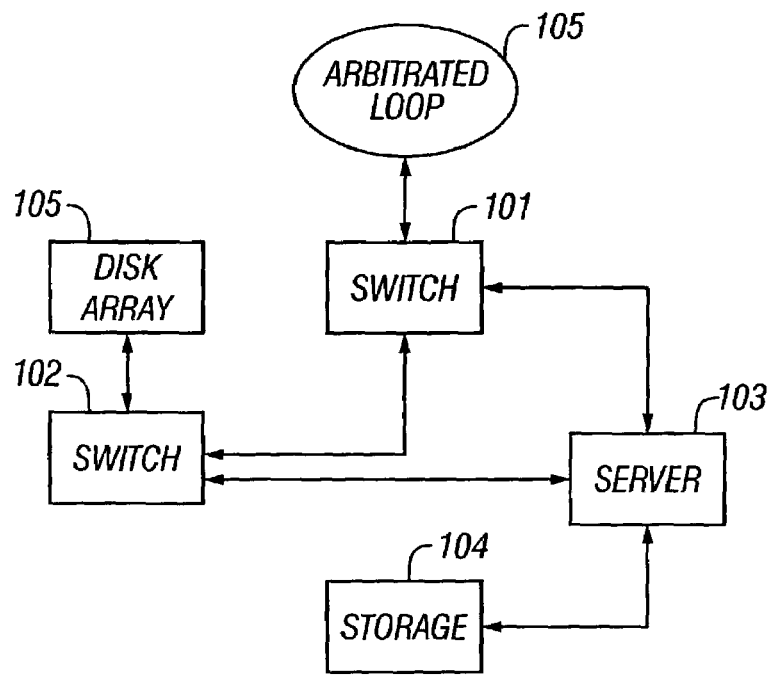
FIG. 1, as described above, shows a block diagram of a fibre channel system using a fibre channel fabric.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 105 may be operationally coupled to switch 101 using arbitrated loop ports (FL;Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Switch 101 includes an E_Port that enables a path to another switch 102. An inter-switch link ("ISL") enables N_Ports to operationally couple to other N-Ports in a fabric.

Figure 2:
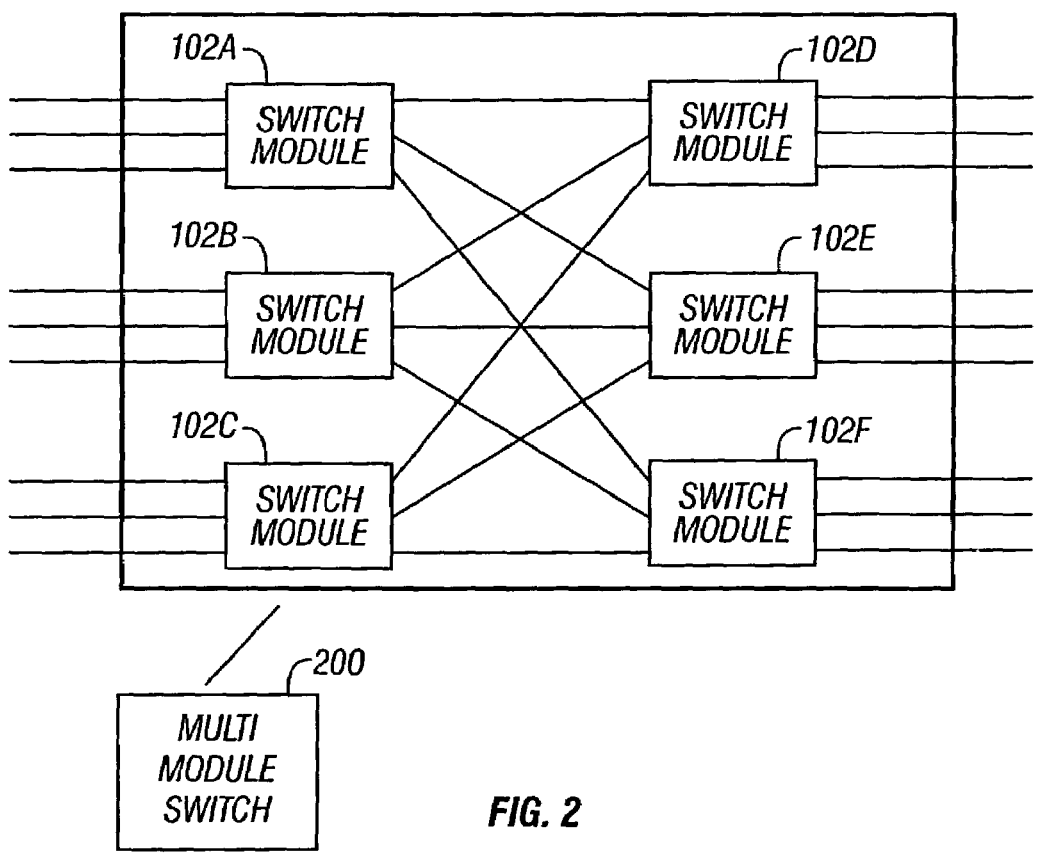
FIG. 2 is a block diagram showing mutli-module switch.

FIG. 2 is a block diagram that shows plural switch modules (or blades) 102A–102F (or 103) integrated into a single multi-module switch 200. Internal ports between the switch modules operate on a multi-blade protocol, while external ports operate under FC-SW-2 protocol. Because of the executable process steps described below, one of the switch modules out of 102A–102F operates as a primary blade so that to other devices in fibre channel system 100, switch module 200 appears as a single switch.

Figure 3:
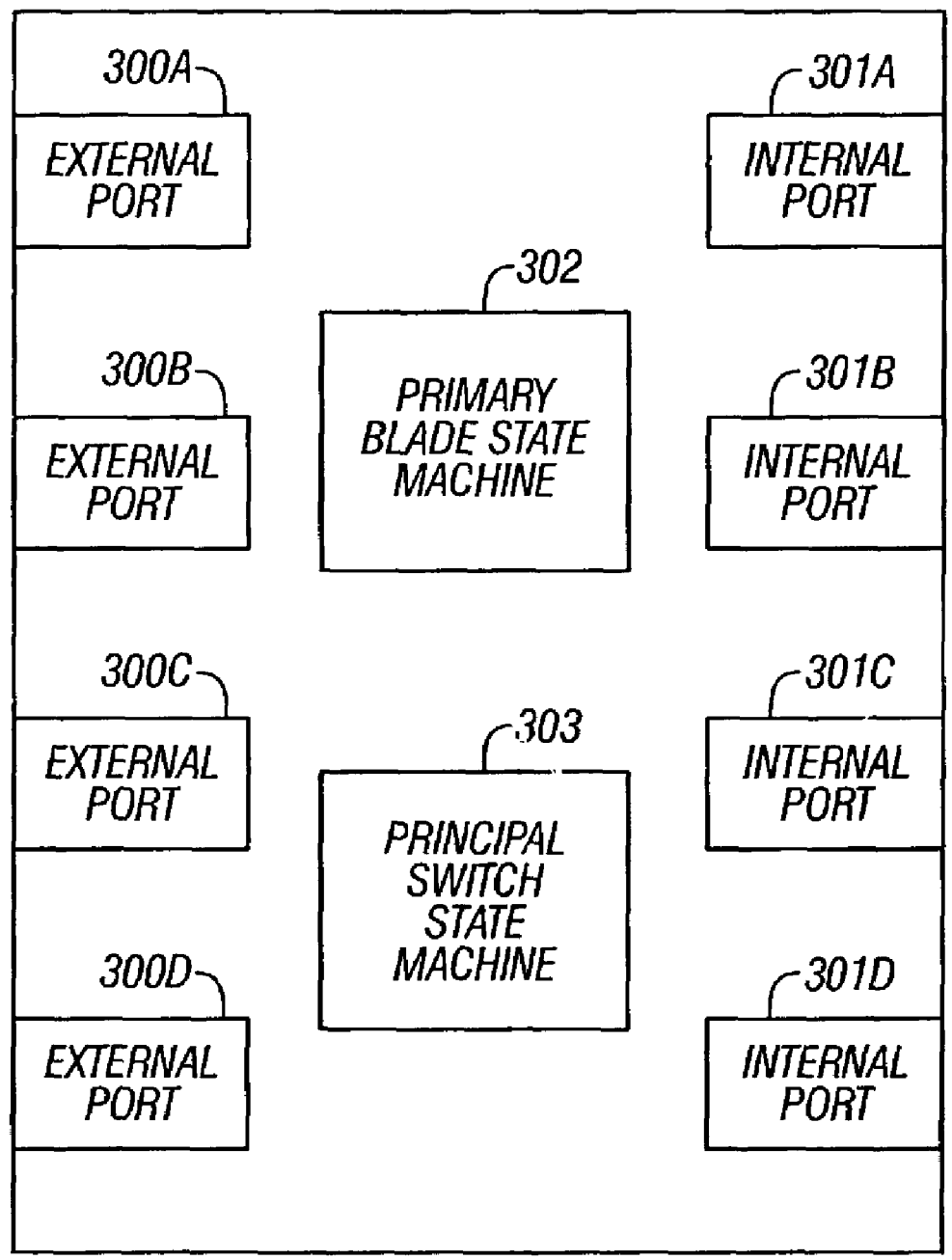
FIG. 3 is block diagram of a switch module in a multi-module switch environment that can select a primary blade, according to one aspect of the present invention.

FIG. 3 is a block diagram of a blade in a multi-module switch, e.g. blade 102A, that implements the adaptive aspects of the present invention. Switch module 102A includes plural external ports (F_Ports operationally coupled to other devices, e.g. server 103; or E_Ports coupled to other switch modules) 300A through 300D; and internal ports 301A–301D that operate under the multi-blade protocol.

Blade 102A also includes a primary blade state machine 302 that uses EBPs under the multi-blade protocol to select the primary blade module for module 200.

Figure 4:
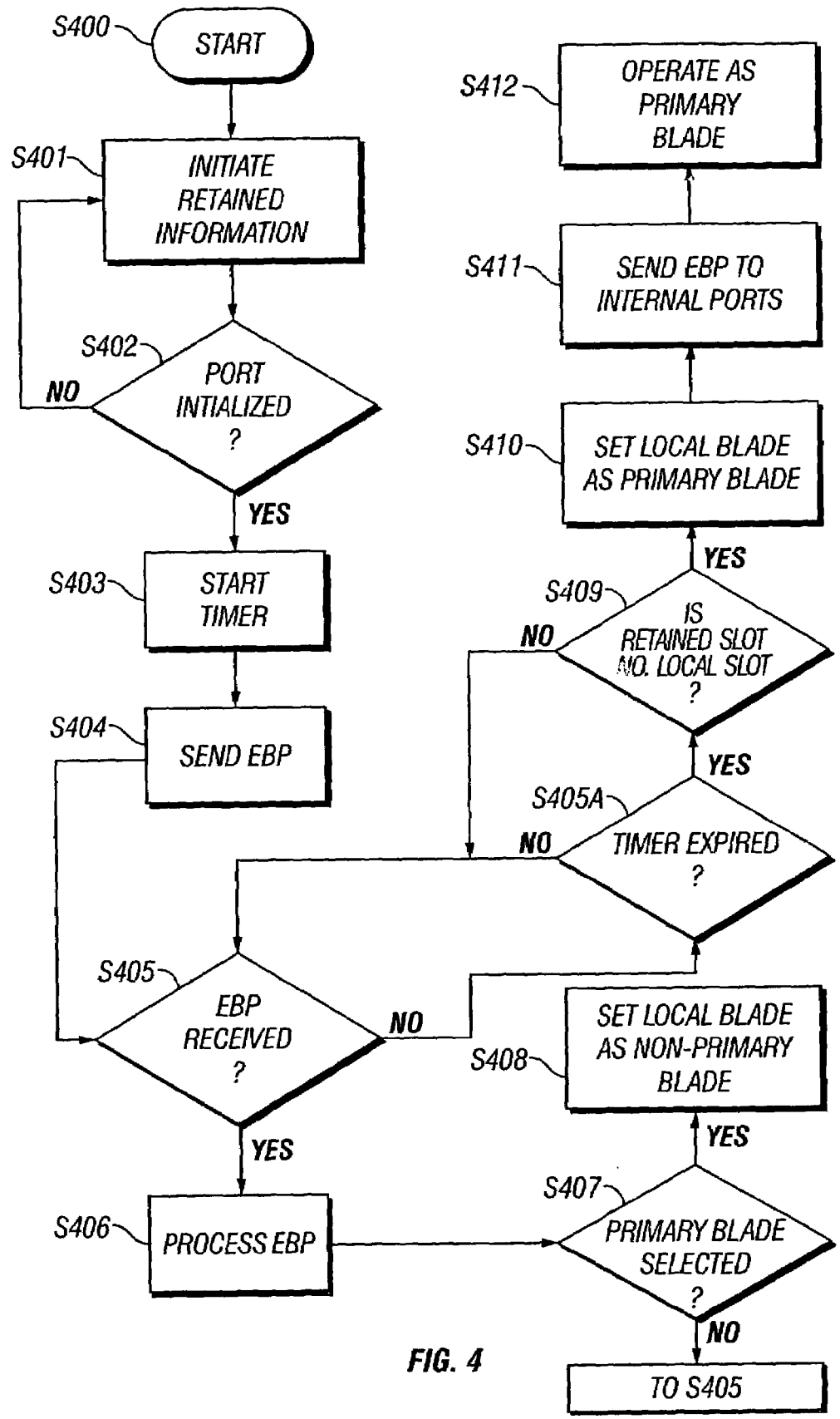
FIG. 4 is a process flow diagram of executable process steps for selecting a primary blade in a multi-module switch environment.

Also included in blade 102A is a principal switch state machine 303 that selects a principal switch from among plural multi-module switches Primary Blade Selection:

FIG. 4 shows a flow diagram of executable process steps for selecting a primary blade in a multi-module switch environment. In one aspect of the present invention EBP parameters are used to select a primary blade, and once a primary blade is selected other blades are notified of the primary blade selection. A blade with the lowest priority and slot number is selected as the primary blade. As defined above, a slot number is unique to a particular blade (or switch module, used interchangeably throughout this specification).

Turning in detail to FIG. 4, in step S400 the process starts and switch module 200 is initialized.

In step S401, retained primary blade priority and blade number is initialized to the blade's priority and blade number.

In step S402, internal ports 301A-301D are initialized.

In step S403, a B_S-TOV timer is started and thereafter, in steps S404, an EBP request is sent to all adjacent blades. In one aspect the B_S_TOV timer (not shown) is operationally coupled or integrated with state machine 302.

An example of an EBP request is provided below:

TABLE 1

EBP Request Payload

| Item | Byte Size |
|---|---|
| Command Code = hex'82' | 1 |
| Reserved | 1 |
| Payload Length | 2 |
| Reserved | 3 |
| Primary Blade Priority | 1 |
| Reserved | 3 |
| Primary Blade Slot Number | 1 |
| Reserved | 3 |
| Primary Blade Assigned | 1 |
| Local Domain Id Status | 1 |
| Reserved | 2 |
| Local Domain Id | 1 |
| Reserved | 3 |
| Switch Priority | 1 |
| Design specific data | N |

Payload Length: This field may contain a 16-bit unsigned integer that specifies the total payload length in bytes. This value is hex'18'+size of design specific data.

Primary Blade Priority: This field specifies the priority level of a blade that an EBP transmitting blade believes is the primary blade.

Primary Blade Slot Number: This field specifies the slot number of the blade that the EBP transmitting blade believes is the primary blade. This value uniquely identifies each blade in a switch derived from the physical location of the module in a chassis.

Primary Blade Assigned: This field indicates that the primary blade role is assigned. If zero, the primary blade has not been selected. If non-zero, the primary blade has been selected. Table 2 below shows an example of primary blade values.

TABLE 2

Primary Blade Assigned Status

| value | Comments |
|---|---|
| 0 | Unassigned. Primary blade selection is in progress. |
| 1 | Assigned. Primary blade role assigned. |

In step S405, the process determines if all switch modules have received an EBP payload. If an EBP payload has been received, then the EBP is processed in step S406, as shown in the process steps of FIG. 5. If a primary blade has been selected, as determined in step S407, the local blade is set as a non-primary blade in step S408. If the primary blade has not been selected, then the process moves back to step S405.

If an EBP is not received in step s405, then in step S405A, the process determines, if the B_S_TOV timer has expired. If the timer has not expired the process moves to step s405.

If the timer has expired, then in step S409, the process determines if the retained slot number is the local slot number. If not, the process moves to step s405.

If the retained slot number is the local slot number, then in step S410, the local blade is set as the primary blade.

In step S411, the primary blade sends EBPs to all internal ports and the selected blade operates as the primary blade in step S412.

Figure 5:
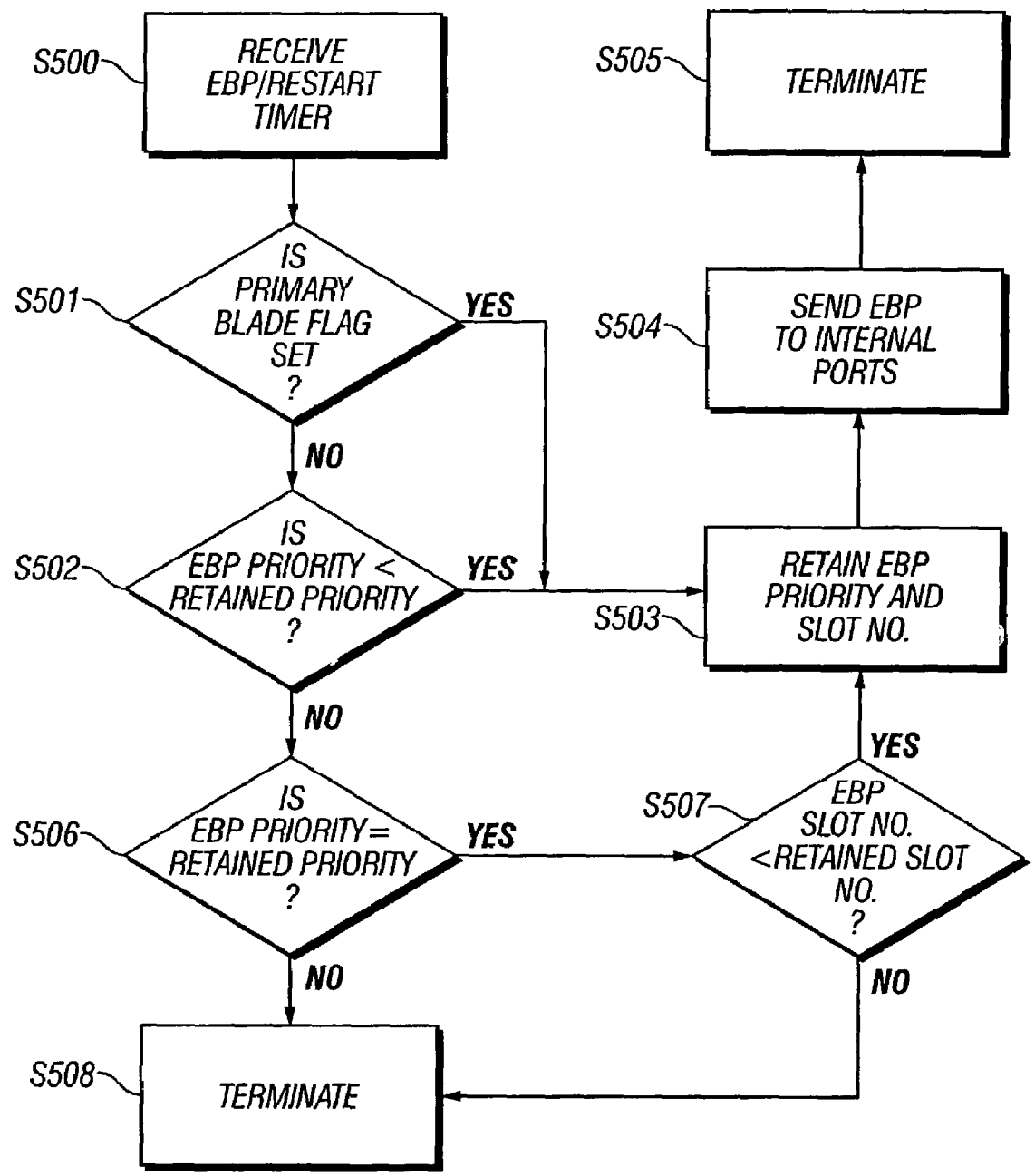
FIG. 5 is a flow diagram of a executable process steps for processing exchange blade parameters for selecting a primary blade, according to one aspect of the present invention.

FIG. 5 is a flow diagram of executable process steps that describes processing of EBPs (step S406) for selecting a primary blade, according to one aspect of the present invention.

Turning in detail to FIG. 5, in step S500, EBP's are received and the B_S_TOV timer is started.

In step S501, the EBP payload is analyzed by primary blade state machine 302, to determine whether a primary blade flag is set. If it is set, then the process moves to step S503, where the EBP priority and slot number replaces the retained priority and slot number.

If the primary blade flag is not set in step S501, then in step S502, the process determines if the EBP priority is less than the retained priority. If it is less, then the process moves to step S503.

If the EBP priority is not less than the retained priority, then in step S506, the process determines if the EBP priority is equal to the retained priority. If not, the process terminates at step S508.

If the EBP priority is equal to the retained priority, then in step S507, the process determines if the EBP slot number is less than the retained slot number. If it is less, then the process moves to step S503. If not, the process terminates at step S508.

Once the EBP priority and slot number are retained in step S503, in step S504 (similar to step S411), EBPs are sent to all internal ports with the selected primary blade and the process terminates in step S505.

In one aspect of the present invention, an efficient process for selecting a primary blade is provided so that the multiple modules in a fibre channel switch are able to self-configure to appear as a single switch, without user configuration or intervention. The foregoing process functions even if not all the modules are present, or if some of the internal ports linking modules have failed, as long as connectivity exists internally between the modules.

Although the present invention has been described with reference to specific embodiments, these embodiments are illustrative only and not limiting. Many other applications and embodiments of the present invention will be apparent in light of this disclosure and the following claims.

What is claimed is:

1. A method for selecting a primary blade in a multi-module fibre channel switch with plural blades, comprising:
   sending exchangeable blade parameter(s) ("EBP") to the plural blades; and
   determining if a primary blade flag is set in an EBP payload.

2. The method of claim 1, further comprising:
   selecting a blade with an EBP priority and blade slot number if the primary blade flag is selected; or selecting a blade with an EBP priority number if the EBP priority number is less than a retained priority number and the primary blade flag is un-selected.

3. The method of claim 2, further comprising:

selecting a blade with an EBP priority number equal to the retained priority number and a EBP slot number is less than the retained primary blade slot number.

4. A method of claim 1, sending EBPs to plural blades notifying the blades of a selected primary blade.

5. A method for selecting a primary blade in a multi-module fibre channel switch with plural blades, comprising:

initializing plural blade internal ports;
starting a timer;
sending EBPs to plural blades;
selecting a primary blade; and
notifying the plural blades regarding the selected primary blade.

6. A system for selecting a primary blade in a multi-module fibre channel switch with plural blades, comprising;

a state machine for sending exchangeable blade parameter (s) ("EBP") to the plural blades; and determining if a primary blade flag is set in an EBP payload.

7. The system of claim 6, wherein the state machine selects a blade with an EBP priority and blade slot number if the primary blade flag is selected; or selects a blade with an EBP priority number if the EBP priority number is less than a retained priority number and the primary blade flag is un-selected.

8. The system of claim 7, wherein the state machine selects a blade with an EBP priority number equal to the retained priority number and a EBP slot number is less than a retained primary blade slot number.

9. The system of claim 6, wherein the state machine sends EBPs to the plural blades notifying the blades of the selected primary blade.

10. A system for selecting a primary blade in a multi module fibre channel switch with plural blades, comprising:

a state machine for intializing plural blade internal ports;
starting a timer;
sending EBPs to plural blades;
selecting a primary blade; and
notifying the plural blades regarding the selected primary blade.

* * * * *